(12) United States Patent
Moore et al.

(10) Patent No.: US 6,202,261 B1
(45) Date of Patent: Mar. 20, 2001

(54) SWIVELLING ANCHOR FOR STORAGE NET AND METHOD OF INSTALLING SAME

(75) Inventors: Donal Moore, Birmingham; Nathalie Tambay, Sterling Heights, both of MI (US)

(73) Assignee: Polytech Netting, L.P., Troy, MI (US)

( * ) Notice: Subject to any disclaimer, the term of this patent is extended or adjusted under 35 U.S.C. 154(b) by 0 days.

(21) Appl. No.: 09/332,651

(22) Filed: Jun. 14, 1999

(51) Int. Cl.[7] ................. A41F 1/00; B42F 1/00; F16G 11/00
(52) U.S. Cl. .......... 24/115 R; 24/459; 24/713.6
(58) Field of Search .............. 24/115 R, 713.6, 24/459

(56) References Cited

U.S. PATENT DOCUMENTS

| | | | |
|---|---|---|---|
| 1,753,216 | * 4/1930 | Peirce, Jr. | 24/115 R |
| 2,260,048 | 10/1941 | Newell . | |
| 2,850,788 | 9/1958 | Rypysc . | |
| 2,962,998 | * 12/1960 | Long | 24/115 R |
| 3,093,435 | * 6/1963 | Johnson | 24/713.6 |
| 4,630,982 | 12/1986 | Fenner . | |
| 4,699,217 | 10/1987 | McLennan et al. . | |
| 4,761,860 | * 8/1988 | Krauss | 24/713.6 |
| 5,142,834 | 9/1992 | Laclave et al. . | |
| 5,348,433 | 9/1994 | Watson . | |
| 5,384,939 | 1/1995 | Weber . | |
| 5,860,196 | * 1/1999 | Murray, Jr. | 24/459 |

FOREIGN PATENT DOCUMENTS

| | | | |
|---|---|---|---|
| 0123031 | * 8/1901 | (DE) | 24/713.6 |
| 536923-A1 | 4/1993 | (EP) . | |
| 0162385 | * 4/1921 | (GB) | 24/713.6 |
| 0000947 | * 9/1887 | (SE) | 24/713.6 |

* cited by examiner

*Primary Examiner*—Victor N. Sakran
(74) *Attorney, Agent, or Firm*—Young & Basile, P.C.

(57) ABSTRACT

An anchor for securing a net cord to a base layer such as carpeting or a thin layer of plastic has a spiral-shaped flange at the end of the anchor which is disposed adjacent the rear surface of the base layer when the anchor is installed. The spiral flange allows the anchor to be mounted to the base layer with a simple twisting motion and without requiring access to the rear surface of the base layer. The anchor is able to swivel freely about its axis yet is highly resistant to being pulled out of the hole. An installation tool has prongs for engaging detent bumps on the anchor and is used by a worker to hold the anchor while it is being mounted the base layer.

13 Claims, 3 Drawing Sheets

SWIVELLING ANCHOR FOR STORAGE NET AND METHOD OF INSTALLING SAME

FIELD OF THE INVENTION

The present invention is related generally to storage nets such as are used to restrain cargo in automotive vehicles, and more specifically to means for anchoring such a net to a surface within the automotive vehicle.

BACKGROUND OF THE INVENTION

In is known in the automotive vehicle industry to provide cargo storage or restraint compartments by attaching sections of netting to surfaces within the passenger and/or cargo areas of a vehicle. The netting is known to be formed from elastic cords, non-elastic cords, or a combination thereof to provide a compartment that is somewhat expandable if desired. For example, it is common to attach a non-elastic netting section to the side walls of a vehicle's trunk or rear cargo area so that the net stretches across the area a short distance forward of the rear bumper. Objects such as grocery bags can then be placed behind the net and are prevented from sliding or rolling forward when the vehicle is in motion. In another example, it is known for a netting section containing some elastic cords to be anchored flat against a vertical surface to form a pocket for holding smaller items, the pocket being somewhat expandable to hold the items snugly against the surface.

In the past, the netting has been held in the desired position by anchors having a ring or aperture through which the cord forming the netting passes. Most often, the anchors have included male fastener having a sheet metal or machine thread for engagement with a hole formed in the metal body structure at the desired point of attachment. If the metal body structure is covered by carpeting or a plastic panel at the point where the anchor is to be mounted, a hole must also be formed in the carpet or panel to allow the male fastener to pass through.

It may be desired to mount a storage net on a carpeted surface within the vehicle, such as inside the trunk or cargo area, or on a lower inside surface of a door. In such a case, it would greatly simplify the manufacturing and assembly of the vehicle if the netting could be anchored directly to the carpet, rather than to the underlying metal structure. In the past, it has been necessary to attach anchors to the carpet prior to the carpet being permanently installed in the vehicle, since the known types of anchors have required that a worker have access to the back surface of the carpet in order to fix the anchor in place. Typically, such an anchor has been inserted through a hole in the carpet and the end of the anchor on the back side of the carpet has been heat staked, or a nut or similar female fastener has been affixed to the end of the anchor projecting through the hole.

It would be simpler, faster, and less expensive to install a net cargo restraint if the anchors holding the net cords in place could be secured to the carpet without requiring access to the back surface. This would allow the anchor to be secured in position after the carpet has been permanently installed in the vehicle. This would be advantageous both when the anchors are installed as original equipment at the time the vehicle is manufactured, and also would greatly simplify the installation of a net cargo restraint as an after-market feature.

Another disadvantage to prior art anchors of the type used for net cargo restraints is that they typically are not able to freely swivel once they are secured to a base layer. As the cord passing through the aperture of an anchor is tugged and moved during normal use, the net cord may tend to become wrapped around or bind in a non-swivelling anchor, and so may be subjected to additional stress which, over time, could damage the cord.

It would be advantageous to provide an anchor that can be simply and quickly attached to a thin base layer, such as carpet or a plastic panel, and which may freely swivel during use.

SUMMARY OF THE INVENTION

It is an objective of this invention to provide an anchor for attachment to a base layer such as carpeting or a thin layer of plastic, which may be installed quickly and simply and without requiring access to a rear surface of the base layer. In general, this objective is achieved by an anchor having a spiral-shaped flange at the end of the anchor which is disposed adjacent the rear surface of the base layer when the anchor is installed. To install the anchor, the end of the anchor having the spiral flange is urged against a hole in the base layer, and the anchor is twisted approximately 90° so that the flange works its way through the hole. The anchor is then able to swivel freely about its axis yet is highly resistant to being pulled out of the hole.

It is another objective of the invention to provide an anchoring system comprising an anchor securable to a base layer and an installation tool used by a worker to hold the anchor imparts the twisting motion to secure it to the base layer. Such an anchoring system allows the anchor to be installed more easily than if the worker were to hold the anchor in his/her bare hand during installation. In the preferred embodiment of the invention, the anchor has a pair of detent bumps formed on either side of an attachment tab, and the installation tool comprises a handle graspable by the worker and first and second arms which fit over the opposite sides of the tab and have holes formed therein for receiving the respective detent bumps.

It is a further objective of this invention to provide a method of quickly and easily anchoring a cord or portion of a netting member to a base layer without requiring access to a rear side of the base layer. The preferred embodiment of the invention method comprises forming a circular hole in the base layer, inserting the cord into engagement with an anchor having a spiral-shaped lower flange, and urging the anchor into the hole and simultaneously rotating it with respect to the base layer so that the spiral-shaped flange draws the anchor into the hole in a screw-like fashion until the base layer is retained between the spiral-shaped flange and a parallel flange of the anchor.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 1:
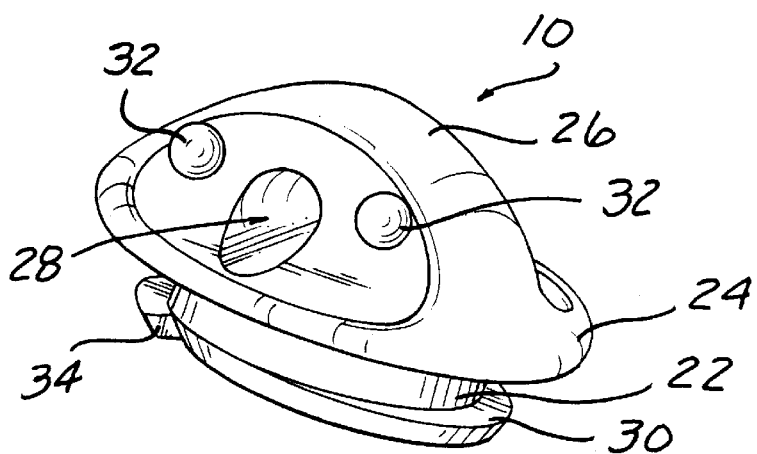
FIG. 1 is a perspective view of an anchor according to the present invention.
Figure 2:
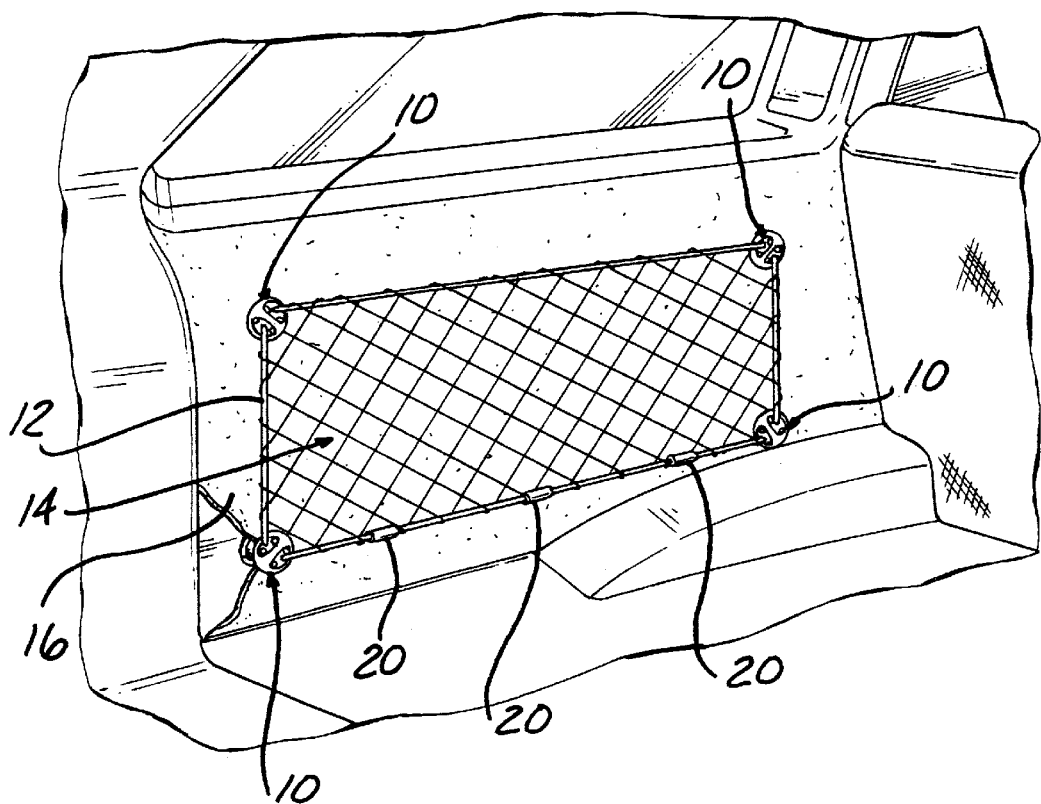
FIG. 2 is a perspective view of a netting storage compartment in a vehicle utilizing four anchors according to the present invention to hold a netting section in connection with a carpeted panel.

Referring to FIGS. 1–4, an anchor 10 according to the present invention is adapted to attach a cord 12 which forms part of a netting section 14 to a base layer 16 such as carpet or a thin plastic panel. One possible application for the invention anchor 10 is shown in FIG. 2, where four anchors 10 are used to restrain the corners of rectangular netting section 14 to an interior rear quarter panel covered in carpeting, thereby forming a storage compartment for preventing articles from rolling or sliding around the vehicle interior. Once attached to the carpet 16, the invention anchor 10 is able to swivel freely relative to the carpet so as to adjust itself to stretching and other movement of the netting section during use. Additional non-swiveling anchors 20 may be located at other points on the netting section 14 to restrain one or more edges of the netting section against the surface so that objects retained in the storage compartment are unlikely to slip out through the closed edge.

The invention anchor 10 may be formed of any appropriate material and by any method, however in the preferred embodiment it is formed as a single, integrally molded piece of high-strength plastic material such as ABS. The anchor 10 generally comprises a cylindrical central plug 22, a circular upper flange 24 disposed at the top end of the plug, an attachment tab 26 extending upwardly from the upper flange and having an aperture 28 formed therethrough, and a spiral-shaped lower flange 30 disposed at the lower end of the plug. The confronting surfaces of the upper and lower flanges 24,30 which are oriented toward the plug 22 are preferably substantially flat and parallel with one another.

Figure 3:
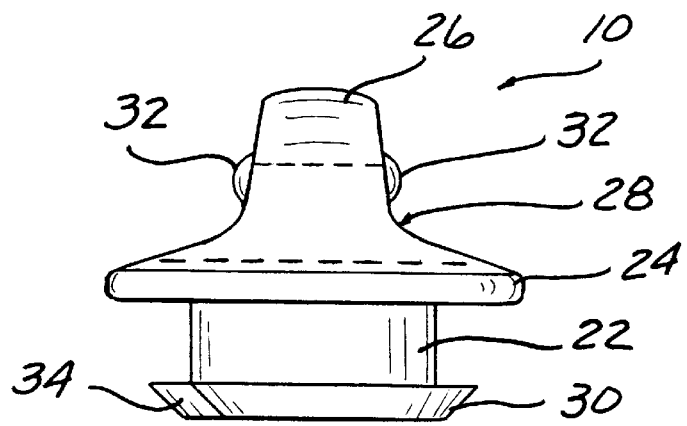
FIG. 3 is a side view of the anchor of FIG. 1.
Figure 6:
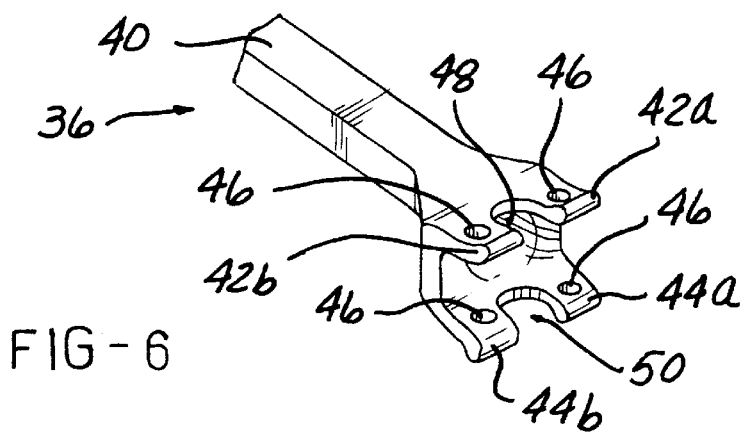
FIG. 6 is a perspective detail view of the head of the installation tool of FIG. 5.

In the preferred embodiment, the attachment tab 26 is generally semi-circular when viewed along the axis of the aperture 28, and extends perpendicular to the plane of the upper flange 24 (see FIG. 3). The aperture 28 in the attachment tab 26 is of the proper diameter to allow the cord 12 to pass therethrough, as illustrated in FIGS. 2 and 6.

A pair of detent bumps 32 are formed on each side of the attachment tab 26. The detent bumps 32 have smooth, rounded outer surfaces and project outwardly from the surface of the tab 26 by only a small amount, on the order of one millimeter.

The lower flange 30 is spiral-shaped, having a minimum radius approximately equal to the radius of the plug 22 and gradually increasing to a maximum radius somewhat greater than the plug radius and the radius of the hole which the anchor 10 is designed to fit. A radially extending step 34 in the outer edge of the lower flange 30 connects the point of minimum radius and the point of maximum radius.

Figure 4:
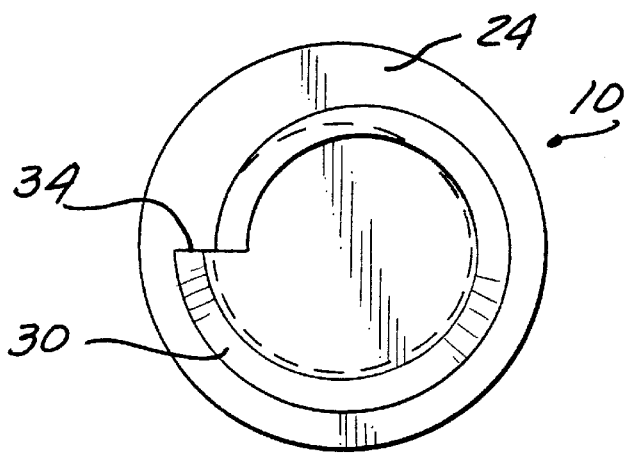
FIG. 4 is a bottom view of the invention anchor.
Figure 5:
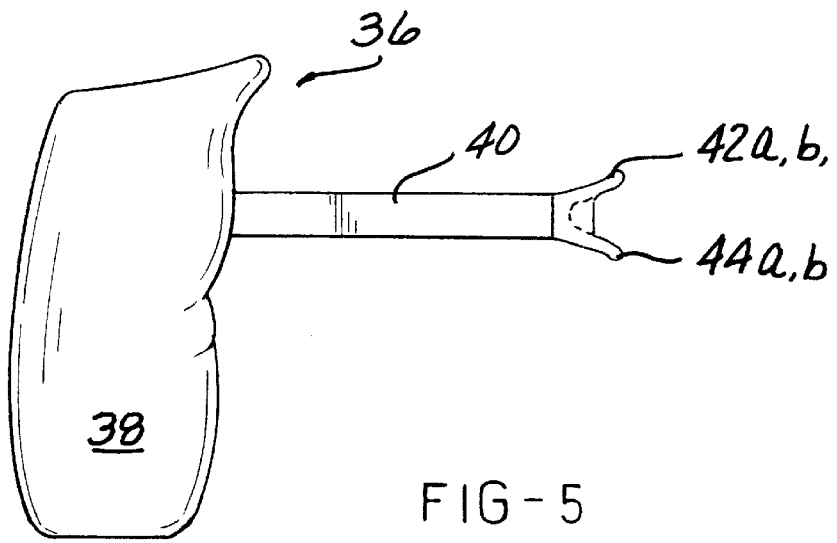
FIG. 5 is a side view of an installation tool according to the present invention.

Referring to FIGS. 4 and 5, an installation tool 36 for use with the invention anchor 10 comprises a handle portion 38 shaped to be grasped by a worker (not shown) and an arm 40 projecting generally perpendicular from the handle. Two upper prongs 42a,42b and two lower prongs 44a,44b extend from the distal end of the arm 40. Each of the prongs 42a,42b,44a,44b has a hole 46 passing therethrough in a direction generally perpendicular to the longitudinal axis of the arm 40.

Figure 7:
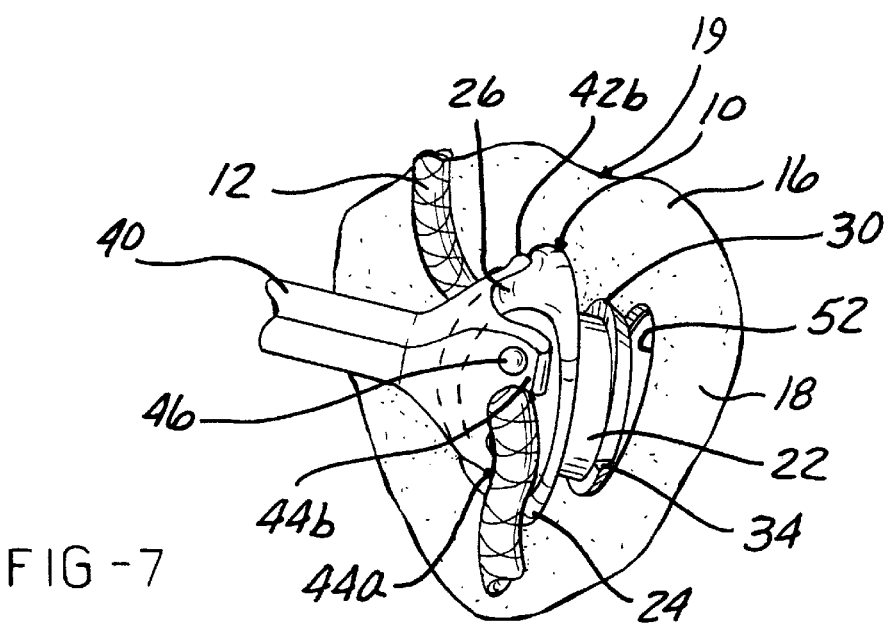
FIG. 7 is a perspective view of the installation tool with an anchor operatively engaged therewith just prior to insertion into a hole in a panel.

The prongs 42a,42b,44a,44b are properly configured to receive the attachment tab 26 therebetween, with the upper prongs 42a,42b on one side of the attachment tab 26 and the lower prongs 44a,44b on the opposite side, as seen in FIG. 7. As the anchor 10 is inserted between the prongs 42a,42b, 44a,44b, the tips of the prongs contact the respective detent bumps 32 and are forced to flex slightly outward to allow the detent bumps 32 to pass therebetween. The prongs 42a,42b, 44a,44b then snap back inwardly as the detent bumps 32 come into alignment with the respective holes 46 in the prongs. The engagement of the detent bumps 32 with the holes 46 retains the anchor 10 in connection with the installation tool 36.

Although the invention is shown with the engagement between the anchor 10 and the installation tool 36 provided by detent bumps 32 disposed on the anchor and mating holes 46 disposed on the installation tool 36, any equivalent engagement means may be substituted without departing from the scope of the invention. For example, any type, shape, or number of male or female features may be disposed on the sides of the attachment tab 26 for engagement with mating features disposed in corresponding positions on the installation tool 36.

A first gap 48 divides the two upper prongs 42a,42b, and a second gap 50 divides the two lower prongs 44a,44b. The gaps 48,50 prevent the installation tool 36 from obstructing the aperture 28 through the tab 26 when the anchor 10 is engaged with the installation tool. This allows the installation tool 36 to be snapped into engagement with an anchor 10 having a cord 12 passing through its aperture 28, as shown in FIG. 7.

In a preferred embodiment of the invention anchor 10, the plug 22 has a diameter of 15 millimeters (mm), the upper flange 24 has a diameter of 25 mm, the lower flange 30 has a minimum radius of 7.5 mm and a maximum radius of 10 mm, the upper and lower flanges are spaced 5 mm apart, and the aperture 28 has a diameter of 6 mm.

According to the invention method of anchoring a cord 12 to a flexible base layer 16, a circular hole 52 is first formed in the base layer 16. An anchor 10 for installation in the hole 52 should have a plug 22 of a diameter approximately equal to the diameter of the hole, and the distance between the upper and lower flanges 24,30 should be approximately equal to the thickness of the base layer 16 for which the anchor is intended.

The anchor 10 is inserted into engagement with the prongs 42a,42b,44a,44b of the installation tool 36. The cord 12 to be anchored may already be threaded through the aperture 28 in the attachment tab 26, or this may be accomplished later. The worker then urges the anchor 10 against the base layer 16 directly over the hole 52, tilting the tool 36 slightly with respect to the plane of the base layer 16 so that the point of minimum radius of the lower flange 30 is urged into the hole 52. The worker then twists the anchor 10 approximately 90° in the clockwise direction, as viewed in FIG. 7, so that the spiral lower flange 30 works its way through the hole 52 until the base layer 16 is between the upper and lower flanges 24,30. As can be seen in FIG. 7, the anchor 10 is inserted into the base layer 16. The lower flange 30 passes from the first side 18 of the base layer 16 to the second side 19 thereof. The worker then disengages the installation tool 36 from the anchor 10 by simply pulling the tool away from the anchor, the prongs 42a,42b,44a,44b flexing outwardly a small distance to allow the detent bumps 32 to escape from the holes 46 in the prongs.

Figure 8:
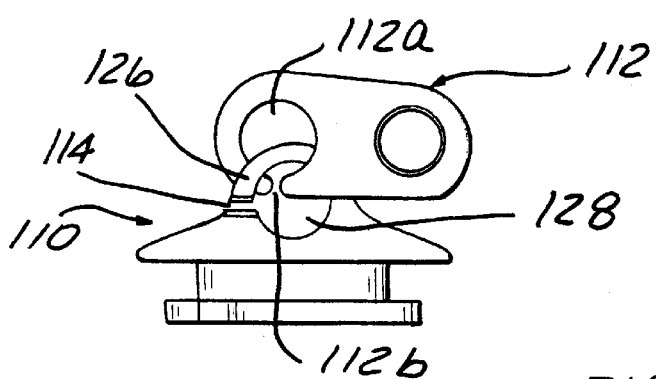
FIG. 8 is a front view of a second embodiment of the invention anchor with a clip attached thereto.

An alternative embodiment of the invention anchor 110 shown in FIG. 8 is adapted for use with a clip 112. A narrow slit 114 passes through the attachment tab 126 and communicates with the aperture 128 in the tab. The clip 112 has a similar arrangement of an aperture 112a and slit 112b. The anchor 110 and clip 112 may be joined and separated by aligning their respective slits 114, 112b. The anchor 110 is shown without any means for engaging an installation tool, but this feature may be added if desired.

As is apparent from the above description, the invention provides an anchor that is easily and quickly mounted to a flexible base layer such as carpet without requiring access to the rear surface of the base layer. When installed, the invention anchor is able to freely swivel within its hole so that it is not necessary to install the anchor in any particular angular position that might be required for a given netting installation. As the cord 12 passing through the aperture 28 moves during loading and unloading of the netting storage compartment, the anchor is able to swivel in response to that movement. Accordingly, the anchor maintains a secure grip on the cord, without the cord being subjected to undesired stress and/or becoming wrapped around the attachment tab 26 in a manner which would cause it to bind within the aperture 28.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

The invention claimed is:

1. An anchor for mounting to a base layer having an opening passing therethrough, the anchor comprising:
    a cylindrical plug having an axial length approximately equal to a thickness of the base layer, and a diameter approximately equal to a minimum dimension of the opening;
    a first flange attached to a first axial end of the plug and extending radially outward beyond the plug, the first flange having means disposed thereon for receiving a component to be anchored to the base layer, wherein the component receiving means comprises an attachment tab projecting therefrom; and
    a spiral-shaped second flange attached to a second axial end of the plug and extending radially outward beyond the plug, the second flange having a minimum radius approximately equal to a radius of the plug and a maximum radius greater than the radius of the plug.

2. The anchor according to claim 1 wherein confronting surfaces of the first flange and the second flange oriented toward the plug are substantially flat and parallel with one another.

3. The anchor according to claim 1 further comprising means for engagement with an installation tool to retain the anchor in removable connection with the installation tool.

4. The anchor as defined in claim 1, further comprising an attachment clip, said attachment clip comprising at least one aperture passing therethrough, wherein said attachment clip comprises a slit passing through the attachment clip and communicating with the at least one aperture.

5. The anchor according to claim 1, further comprising an attachment clip, said attachment clip comprising a first aperture and a second aperture passing therethrough, wherein said attachment clip comprises a slit passing through the attachment clip and communicating with said first aperture.

6. An anchor for mounting to a base layer having first and second sides and a circular hole passing therethrough, the anchor comprising:
    a cylindrical plug having an axial length approximately equal to a thickness of the base layer, and a diameter approximately equal to a diameter of the hole;
    a first flange attached to a first axial end of the plug and extending radially outward beyond the plug, the first flange having means disposed thereon for receiving a component to be anchored to the base layer wherein the means for receiving a component to be anchored to the base layer comprises an attachment tab projecting from the first flange;
    a spiral-shaped second flange attached to a second axial end of the plug and extending radially outward beyond the plug, the second flange having a minimum radius approximately equal to a radius of the plug and a maximum radius greater than the radius of the plug; and
    means for engagement with an installation tool to retain the anchor in removable connection with the installation tool, wherein the engagement means comprises at least one of a first male feature and a first female feature disposed on a first side of the attachment tab for engagement with a first mating feature on the installation tool, and at least one of a second male feature and a second female feature disposed on an opposite second side of the attachment tab for engagement with a second mating feature on the installation tool.

7. The anchor according to claim 6 wherein the engagement means comprises two first detent bumps projecting from the first side of the attachment tab and two second detent bump projecting from the second side of the attachment tab.

8. An anchoring system for securing a cord to a base layer having first and second sides and a circular hole passing therethrough, the system comprising an anchor for insertion into the hole and an installation tool for holding the anchor and allowing an assembly person to insert the anchor into the hole and rotate the anchor to secure it to the base layer;
    the anchor comprising:
        a first flange for contacting the first side of the base layer when the anchor is inserted in the hole and having means for receiving the cord wherein the means for receiving the cord comprises an attachment tab extending from the first flange;
        a second flange for contacting the second side of the base layer when the anchor is inserted in the hole; and
        means for engaging the installation tool, wherein the means on the anchor for engaging the installation tool comprises at least one of a first male feature and a first female feature disposed on a first side of the attachment tab, and at least one of a second male feature and a second female feature disposed on an opposite second side of the attachment tab;
    and the installation tool comprising:
        a handle graspable by the assembly person; and
        means for engaging the anchor wherein the means on the installation tool for engaging the anchor comprises first and second prongs for receiving the attachment tab therebetween and having mating features for engaging the features on the first and second sides of the attachment tab.

9. The anchoring system according to claim 8 wherein at least one first detent bump projects from the first side of the attachment tab and at least one second detent bump projects from the second side of the attachment tab, and the first and second prongs have holes formed therein for receiving the respective first and second detent bumps.

10. A method of anchoring a cord to a base layer, the method comprising the steps of:

forming an opening in the base layer, said opening having a maximum dimension;

providing an anchor comprising first and second flanges spaced apart by a distance approximately equal to a thickness of the base layer, the first flange having an aperture formed therethrough for receiving the cord wherein the first flange having an aperture comprises an attachment tab projecting therefrom, and the second flange being spiral-shaped and having a minimum radius approximately equal to the maximum dimension of the opening and a maximum radius greater than the maximum dimension of the opening;

inserting the cord through the aperture in the tab;

urging the second flange into contact with the base layer in alignment with the opening; and rotating the anchor with respect to the base layer to urge the second flange through the opening until the base layer is between the first and second flanges.

11. The method according to claim 10 further comprising the steps of:

providing an installation tool having a handle for being grasped by a worker and means for engaging mating means on the anchor;

inserting the anchor into engagement with the installation tool prior to the urging step such that anchor is held by the installation tool during the urging and rotating steps; and releasing the engagement between the installation tool and the anchor after the rotating step.

12. An anchor for mounting to a base layer having an opening passing therethrough, the anchor comprising:

a cylindrical plug having an axial length approximately equal to a thickness of the base layer, and a diameter approximately equal to a minimum dimension of the opening;

a first flange attached to a first axial end of the plug and extending radially outward beyond the plug, the first flange comprising an attachment tab projecting therefrom and having an aperture disposed thereon for receiving a component to be anchored to the base layer; and a spiral-shaped second flange attached to a second axial end of the plug and extending radially outward beyond the plug, the second flange having a minimum radius approximately equal to a radius of the plug and a maximum radius greater than the radius of the plug;

said attachment tab comprising a slit passing therethrough communicating with the aperture.

13. The anchor as defined in claim 12, further comprising an attachment clip, said attachment clip comprising a first aperture and a second aperture passing therethrough, wherein said attachment clip comprises a slit passing through the attachment clip and communicating with said first aperture, whereby the anchor and the attachment clip are detachably coupled through their respective slits.

* * * * *